United States Patent
Olofsson

(10) Patent No.: US 12,535,439 B2
(45) Date of Patent: Jan. 27, 2026

(54) ILLUMINATION CONTROL DEVICE FOR A CHARGED PARTICLE ANALYSER

(71) Applicant: Scienta Omicron AB, Uppsala (SE)

(72) Inventor: Mikael Olofsson, Uppsala (SE)

(73) Assignee: Scienta Omicron AB, Uppsala (SE)

( * ) Notice: Subject to any disclaimer, the term of this patent is extended or adjusted under 35 U.S.C. 154(b) by 356 days.

(21) Appl. No.: 18/546,706

(22) PCT Filed: Feb. 3, 2022

(86) PCT No.: PCT/SE2022/050120
§ 371 (c)(1),
(2) Date: Aug. 16, 2023

(87) PCT Pub. No.: WO2022/177487
PCT Pub. Date: Aug. 25, 2022

(65) Prior Publication Data
US 2024/0310309 A1    Sep. 19, 2024

(30) Foreign Application Priority Data
Feb. 18, 2021    (SE) .................................. 2150175-4

(51) Int. Cl.
*G01N 23/227* (2018.01)
(52) U.S. Cl.
CPC .................. *G01N 23/227* (2013.01)
(58) Field of Classification Search
None
See application file for complete search history.

(56) References Cited

U.S. PATENT DOCUMENTS

| 2003/0080302 A1* | 5/2003 | Yashiro | ................. B82Y 10/00 250/504 R |
| 2012/0249988 A1* | 10/2012 | Runde | ................. G03F 7/70108 355/77 |

(Continued)

FOREIGN PATENT DOCUMENTS

| CA | 3112257 A1 | 3/2020 |
| EP | 2851933 A1 | 3/2015 |

(Continued)

OTHER PUBLICATIONS

International Search Report and Written Opinion mailed Mar. 3, 2022, directed to International Application No. PCT/SE2022/050120; 11 pages.

(Continued)

*Primary Examiner* — Andrew Smyth
(74) *Attorney, Agent, or Firm* — Morrison & Foerster LLP

(57) ABSTRACT

Described are illumination control devices, for an analyser arrangement and method of using thereof. The analyser arrangement is configured to determine at least one parameter related to charged particles emitted from a sample. The illumination control device comprises an input for input electromagnetic radiation, and is configured to control the illumination of the sample to induce the emission of charged particles from the sample and to operate in at least a first mode and a second mode, wherein the illumination control device in the first mode, is configured to illuminate a first area of the sample with a first part of the input electromagnetic radiation and a second area part of the first area of the sample with a second part of the input electromagnetic radiation, and in a second mode, is configured to illuminate the second area of the sample with the second part of the input electromagnetic radiation.

16 Claims, 3 Drawing Sheets

(56) References Cited

U.S. PATENT DOCUMENTS

2016/0320320 A1   11/2016  Yun et al.
2018/0164699 A1*  6/2018   Tukker ............. G01N 21/95607
2019/0120753 A1   4/2019   Prater et al.
2019/0234852 A1   8/2019   Scullion et al.

FOREIGN PATENT DOCUMENTS

EP      3032563 A1      6/2016
JP      4336488 B2      9/2009
WO      2005/109467 A2  11/2005
WO      2016/143450 A1  9/2016

OTHER PUBLICATIONS

Office Action dated Nov. 2, 2021, directed to SE Application No. 2150175-4; 8 pages.
Extended European Search Report dated Nov. 11, 2024, Directed to EP Application No. 22756636.1; 6 pages.

* cited by examiner

ILLUMINATION CONTROL DEVICE FOR A CHARGED PARTICLE ANALYSER

CROSS-REFERENCE TO RELATED APPLICATIONS

This application is a U.S. national stage application under 35 U.S.C. 371 of International Application No. PCT/SE2022/050120, filed Feb. 3, 2022, which claims the priority of Sweden Application No. 2150175-4, filed Feb. 18, 2021, the entire contents of each priority application of which is incorporated herein by reference.

FIELD OF THE DISCLOSURE

The present invention relates to an illumination control device, for an analyser arrangement, configured to determine at least one parameter related to charged particles emitted from a sample, wherein the illumination control device comprises an input for input electromagnetic radiation, and is configured to control the illumination of the sample with the input electromagnetic radiation in order to induce the emission of charged particles from the sample.

BACKGROUND OF THE DISCLOSURE

Photoelectron Spectroscopy (PES) is a well-established method for measurement of photoelectrons from a surface. In PES a sample is illuminated with electromagnetic radiation which induces the emission of photoelectrons. The emitted photoelectrons are analysed with a photoelectron spectrometer. In a photoelectron spectrometer of hemispherical deflector type, a central component is the measurement region in which the energies of the electrons are analysed. In Angle Resolved Photoelectron Spectroscopy (ARPES) a complete measurement requires full detection of a predetermined solid angle from a well aligned sample. Depending on sample and excitation energy/kinetic energy the required angular range may vary. The angle resolution requirements also varies with application but typically range from 1 degree down to better than 0.1 degrees. In energy resolution the desired span is from 0.5 eV down to 0.5 meV depending on application. In order to achieve a high resolution measurement the analyser arrangement must have sufficient angular and energy resolution, but since the hemispherical analyser arrangement only accepts electrons emitted within a limited angular range perpendicular to the lens axis, the sample manipulator must have very high precision movements and repeatability. For some samples it is necessary for the sample manipulator to have not only a high angular precision but also a high precision for lateral movement. A reason for the need for a high lateral precision is that some samples have a varying structure on the surface. For some crystals the surface may have a structure with a dimension of a few micrometres (μm). In order to be able to measure on such small structures with PES or ARPES the spot size of the emission inducing radiation has to be on the same scale as the structures or smaller. Thus, the spot of the electromagnetic radiation on the sample, which electromagnetic radiation induces the emission of charged particles, has to have a size of a few micrometres. ARPES with the charged particle inducing radiation focused to such a small spot is sometimes referred to as Micro ARPES.

A problem in Micro ARPES and other similar PES techniques where the inducing electromagnetic radiation is focussed to a small spot is that it is difficult to position the radiation spot on a single structure on the sample.

SUMMARY OF THE DISCLOSURE

An object of the present invention is to provide a method and an illumination control device with which the positioning of a radiation spot on an area of interest on a sample is facilitated.

Another object of the present invention is to provide a method and an illumination control device with which the positioning of a radiation spot on an area of interest on a sample is facilitated while still maintaining a radiation spot which is sufficiently small for Micro ARPES.

At least one of these objects is fulfilled with an illumination control device and a method according to the independent claims.

Further advantages are provided with the features of the dependent claims.

According to a first aspect of the invention an illumination control device for an analyser arrangement is provided. The analyser arrangement is configured to determine at least one parameter related to charged particles emitted from a sample, and may be operated in a spatial mode in which the charged particles are analysed based on their spatial origins from the sample, and an angular mode in which the charged particles are analysed based on their angular distribution from the sample. The illumination control device comprises an input for input electromagnetic radiation and is configured to control the illumination of the sample with the input electromagnetic radiation in order to induce the emission of charged particles from the sample. The illumination control device is characterised in that the illumination control device is configured to operate in at least a first mode and a second mode, wherein the illumination control device in the first mode, is configured to illuminate a first area of the sample with a first part of the input electromagnetic radiation and a second area of the sample with a second part of the input electromagnetic radiation, and in the second mode, is configured to illuminate the second area of the sample with the second part of the input electromagnetic radiation, and wherein the second area is a part of the first area.

The first part of the input electromagnetic radiation forms a first ray and the second part of the input electromagnetic radiation forms a second ray.

With an illumination control device according to the first aspect of the present invention the positioning of a small radiation spot on the sample is facilitated. When positioning the sample the illumination control device may be set in the first mode and the analyser arrangement may be set in the spatial mode. By analysing the charged particles in the spatial mode it is in principle possible to create an image of the part of the sample which is illuminated, i.e., the part of the sample within the second area. As the first area is a part of the second area the second area will also be visible in the image. Thus, it is possible to determine the position of the second area in relation to the structures on the sample which have been illuminated within the first area.

Another advantage is that it is possible to use only one source of radiation. With only one source of radiation both spots have the same wavelength making it easy to see both spots.

The illumination control device may comprise a splitting element which is configured to divide the input electromagnetic radiation from the input into the previously mentioned first part and second part, a first direction element for directing the first part of the input electromagnetic radiation to the first area, a second direction element for directing the second part of the input electromagnetic radiation to the second area. This is a favourable method for providing a first part and a second part of electromagnetic radiation as the different parts origin from the same source and thus have the same wavelengths. Additional direction elements may of course be added.

The illumination control device may comprise a first blocking member configured to block the first part of the electromagnetic radiation when the illumination control device is operating in the second mode. By having a first blocking member the first direction element may be fixed. This is favourable in that the alignment of the splitting element and the first direction element is not affected when the illumination control device is switched between the first mode and the second mode. As an alternative to having a first blocking member the first direction element may be adjustable between at position, in which the first part of the input electromagnetic radiation is directed towards the sample, and a second position, in which the first part of the input electromagnetic radiation is directed away from the sample.

The illumination control device may comprise a second blocking member and be configured to operate also in a third mode in which the second blocking member is configured to block the second part of the input electromagnetic radiation, and in which the illumination device is configured to illuminate only the first area of the sample with the first part of the input electromagnetic radiation. This is a useful mode when the analyser arrangement is used in the spatial mode. Similarly to above, the described third mode may be provided by providing an adjustable second direction member. However, as for the first direction element it is advantageous to have the second direction element stationary to maintain the alignment between the splitting element and the second direction element.

The splitting element may be a mirror comprising an aperture, wherein the mirror is configured to reflect the first part or the second part of the input electromagnetic radiation towards the corresponding direction element and wherein the aperture is configured to allow the other part of the input electromagnetic radiation to pass to the corresponding direction element. The splitting element must not be flat but may have a concave shape. The size of the aperture sets the amount of electromagnetic radiation in the second area and the minimum size of the second area. A mirror is best suited for the photon energies of the input electromagnetic radiation usually used for Micro ARPES. Preferably, wave length independent mirrors, such as, e.g., mirrors having a reflecting metal layer, are used. It is possible to use multi-layer mirrors, but a drawback with such mirrors are that they are usually designed for only one wavelength and can then only be used for one wavelength without changing the geometry. If the photon energies are in the range in which glass or other material is transparent it is possible to use any type of beam splitter.

It is preferable to configure the splitting element such that the second part of the input electromagnetic radiation passes the aperture and to arrange the aperture to allow the central part of the input electromagnetic radiation to pass the aperture. This will enable a good optical quality of the second part of the input electromagnetic radiation, which is more important as the second part is to be focused on a smaller area on the sample. The good optical quality will enable the second part to be focussed to a small spot.

Preferably, the aperture is oval. Due to the splitting element being tilted the shape of the aperture, seen along the direction of the input electromagnetic beam, will be circular. This will enable a better quality of the passing beam than a square aperture.

The first direction element may comprise a first concave mirror which is configured to focus the first part of the input electromagnetic radiation and to direct the first part of the input electromagnetic radiation towards the first area. A concave mirror is suitable for the photon energies of the input electromagnetic radiation usually used for Micro ARPES. However, if the photon energies are in the range in which glass or other material is transparent it is possible to use a lens for the focusing of the first part of the input electromagnetic radiation. The first direction element may then comprise, e.g., a plane mirror and a lens. It is also possible to use multi-layer mirrors but as they are usually designed for one wavelength only they can only be used for one wavelength without changing the geometry.

The second direction element may comprise a second concave mirror which is configured to focus the second part of the input electromagnetic radiation and to direct the second part of the input electromagnetic radiation to the second area. A concave mirror is suitable for the photon energies of the input electromagnetic radiation usually used for Micro ARPES. However, if the photon energies are in the range in which glass or other material is transparent it is possible to use a lens for the focusing of the second part of the input electromagnetic radiation. The second direction element may then comprise, e.g., a plane mirror and a lens.

The first concave mirror and the second concave mirror are arranged such that the main direction of the corresponding electromagnetic radiation from the splitting element is incident on the first mirror and the second concave mirror at an angle of >70-80° to the normal to the corresponding mirror. By arranging the first mirror and the second mirror in this way a high reflectance is enabled for the photon energies of interest for Micro ARPES.

According to a second aspect of the present invention an analyser arrangement for determining at least one parameter related to charged particles emitted from a samples provided. The analyser arrangement may be operated in a spatial mode in which the charged particles are analysed based on their spatial origins from the sample, and an angular mode in which the charged particles are analysed based on their angular distribution from the sample, and wherein the analyser arrangement comprises an illumination control device according to the first aspect of the invention.

The analyser arrangement may comprise a measurement region having an entrance allowing said particles to enter the measurement region: a lens system for forming a particle beam of said charged particles and transporting the particles between said particle emitting sample and said entrance of the measurement region, said lens system having a substantially straight optical axis; and a analyser device for detecting, in the angular mode, the positions of the charged particles in the measurement region, said positions being indicative of said at least one parameter. This is a common configuration of an analyser arrangement for analysing charged particles.

According to a third aspect a method is provided for positioning and analysing a sample in an analyser arrangement for determining at least one parameter related to charged particles emitted from the sample. The analyser arrangement is configured to be operated in a spatial mode in which the charged particles are analysed based on their spatial origins from the sample, and an angular mode in which the charged particles are analysed based on their angular distribution from the sample. The method comprises the steps of, with the analyser arrangement in the spatial mode, illuminating, with a first ray of electromagnetic radiation, a first area of the sample, illuminating, with a second ray of electromagnetic radiation, a second area of the sample with electromagnetic radiation, and positioning, while analysing the charged particles, the sample such that the second area coincides with an area or interest on the sample; and, with the analyser arrangement in the angular mode: illuminating only the second area of the sample with the second ray of electromagnetic radiation, and analysing the charged particles based on their angular distribution from the sample, wherein the second area is a part of the first area.

With the method according to the third aspect of the invention it is possible to see the structures surrounding the second area during positioning of the sample. This facilitates the positioning of the second area on the sample.

The electromagnetic radiation may have a photon energy in the interval 5-100 eV and preferably 10-50 eV. These energy ranges are suitable for Micro ARPES.

The first area may have a largest dimension on the sample in the interval 0.05-5 mm, preferably 0.1-1 mm. This is a suitable for enabling positioning of the second area on the sample.

The largest dimension of the first area is defined as the area within which the intensity of the electromagnetic radiation is at least 50% of the top intensity of the first ray at the sample. The largest dimension may of course be defined in other ways.

The second area has a largest dimension on the sample in the interval 1-100 μm, and preferably 1-25 μm. The interval ranges are common for Micro ARPES.

The largest dimension of the second area is defined as the area within which the intensity of the electromagnetic radiation is at least 50% of the top intensity of the second ray at the sample. The largest dimension may be defined in other ways.

In the following preferred embodiments of the invention will be described with reference to the drawings.

DETAILED DESCRIPTION OF THE DISCLOSURE

Figure 1:
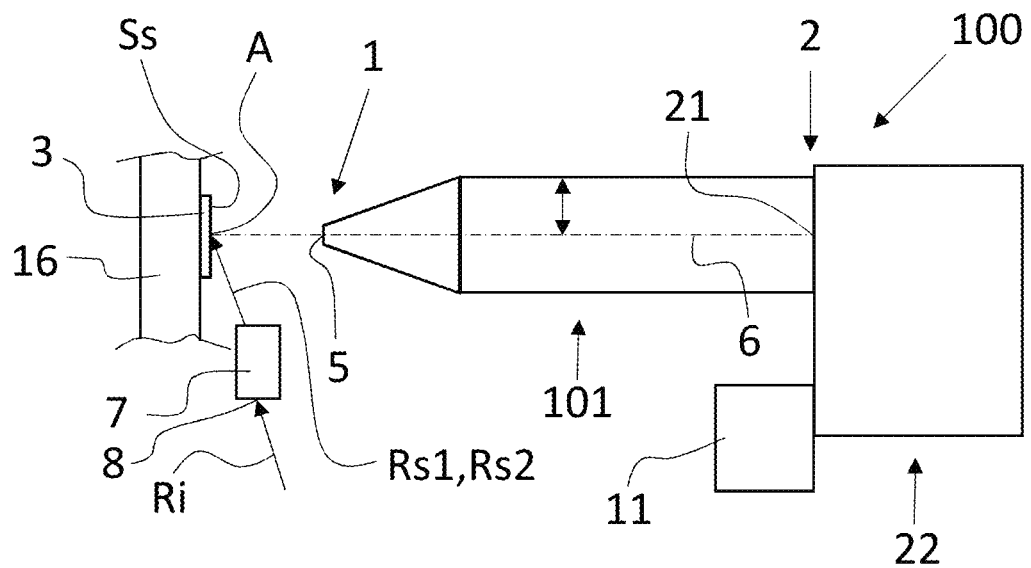
FIG. 1 shows schematically an analyser arrangement with an illumination control device according to an embodiment of the present invention.

The invention is described in the following illustrative and non-limiting detailed description of exemplary embodiments, with reference to the appended drawings. In the drawings, similar features in different drawings are denoted by the same reference numerals. The drawings are not drawn to scale.

FIG. 1 shows schematically an analyser arrangement 100 for determining at least one parameter related to charged particles. The analyser arrangement 100 comprises an electrostatic lens system 101 with a first end 1, and a second end 2 at a distance from the first end 1. The electrostatic lens system 101 comprises an aperture 5 at the first end 1 and a substantially straight optical axis 6 extending through the aperture from the first end 1 to the second end 2. Charged particles may enter the electrostatic lens system 101 at the first end 1. A particle emitting sample 3 is arranged on a sample holder 16. The particle emitting sample 3 is arranged with its sample surface Ss facing the first end 1 of the electrostatic lens system 101. Charged particles may be caused to be emitted from the sample surface Ss by electromagnetic radiation Rs1, Rs2. The charged particles may enter the electrostatic lens system 101 through the aperture 5. The electrostatic lens system 101 is arranged to form a particle beam of charged particles, emitted from a measurement area A on the sample surface Ss of the particle emitting sample 3, which enter the lens system at the first end 1 and to transport the charged particles to the second end 2. After having reached the second end the particles may be input through an entrance 21 into a measurement region 22 through an analyser device 11 shown with the dashed line in FIG. 1. The analyser arrangement 100 may be operated in a spatial mode, in which the charged particles are analysed based on their spatial origins from the sample, and an angular mode, in which the charged particles are analysed based on their angular distribution from the sample. In the spatial mode the analyser arrangement 100 resembles an electron microscope. When the analyser arrangement 100 is operating in the angular mode the analyser is configured to determine at least one parameter related to the charged particles emitted from the sample 3. The analyser arrangement 100 comprises an illumination control device 7, for controlling the illumination of the sample surface Ss. The illumination control device 7 comprises an input 8 for input electromagnetic radiation Ri from a radiation source (not shown). The radiation source may be any suitable radiation source such as a synchrotron, or a laser. The radiation source may have a photon energy in the interval 5-100 eV and preferably 10-50 eV. The problem, which this invention aims to solve, is smaller for visible light.

Figure 2:
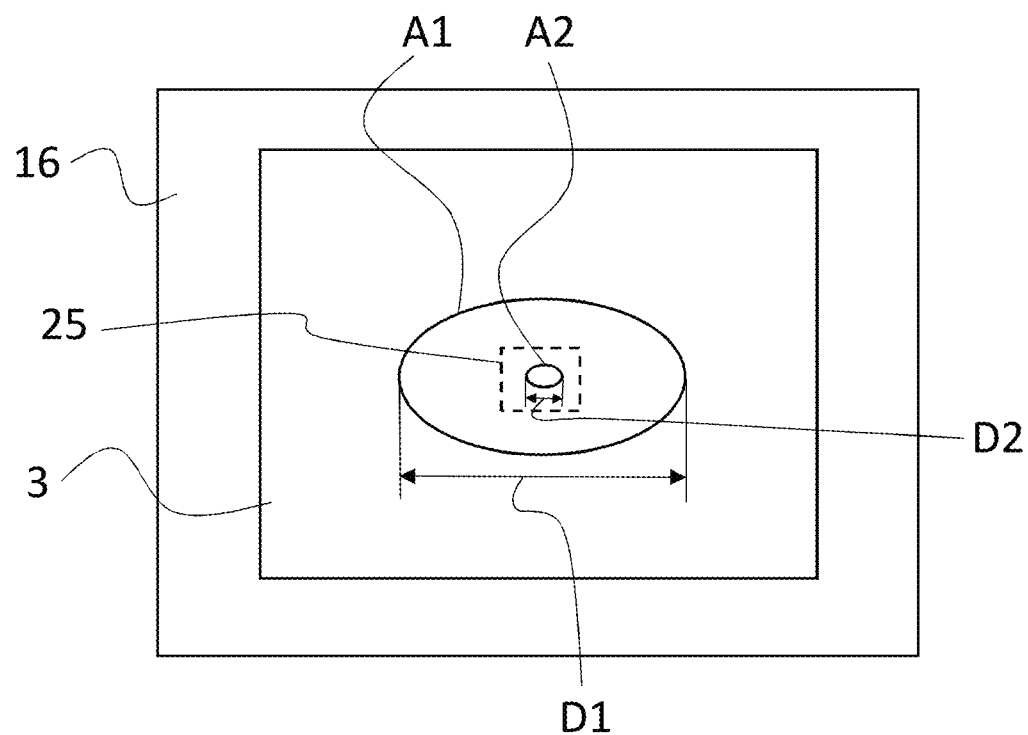
FIG. 2 illustrates in a plan view a sample illuminated by a first part of input electromagnetic radiation and a second part of input electromagnetic radiation.

FIG. 2 illustrates in a view along the optical axis 6 a sample 3 illuminated by a first part Rs1 of the input electromagnetic radiation Ri and a second part Rs2 of the input electromagnetic radiation Ri. The division of the input electromagnetic radiation Ri in a first part Rs1, constituting a first ray, and a second part Rs2, constituting a second ray, will be described in more detail with reference to FIG. 3 and FIG. 4.

The illumination control device 7 is configured to control the illumination of the sample 3 with the input electromagnetic radiation Ri in order to induce the emission of charged particles from the sample 3. The illumination device may be configured to operate in at least a first mode and a second mode. In the first mode the illumination control device is configured to illuminate a first area A1 of the sample 3 with a first part Rs1 of the input electromagnetic radiation and a second area A2 of the sample 3 with a second part of the input electromagnetic radiation. In a second mode, is configured to illuminate the second area A2 of the sample with the second part of the input electromagnetic radiation, wherein the second area A2 is a part of the first area A1. In FIG. 2 the first area A1 has an elongated shape. The first area A1 has a first largest dimension D1 on the sample 3 and the second area A2 has a second largest dimension D2 on the sample 3. The first area A1 has a largest dimension D1 on the sample 3 in the interval 0.05-5 mm, preferably 0.1-1 mm. The second area A2 has a largest dimension D2 on the sample 3 in the interval 1-100 µm, and preferably 1-25 µm.

The first area A1 corresponds to the area illuminated by the first part of the input electromagnetic radiation Rs1. The first area A1 is elongated due to the angle of incidence on the sample 3. The intensity of the electromagnetic radiation within the first area A1 varies. Optimally, the first part of the input electromagnetic radiation Rs1 is incident on the sample 3 is distributed with a top intensity at the centre of the first area A1 and an outwardly decreasing intensity. The border of the first area A1 is the border at which the intensity of the electromagnetic radiation has decreased to 50% of the top intensity within the first area A1. Correspondingly, the second area A2 corresponds to the area illuminated by the first part of the input electromagnetic radiation Rs1. The second area A2 is elongated due to the angle of incidence on the sample 3. The intensity of the electromagnetic radiation within the second area A2 varies. Optimally, the first part of the input electromagnetic radiation Rs1 is incident on the sample 3 is distributed with a top intensity at the centre of the first area A1 and an outwardly decreasing intensity. The border of the second area A2 is the border at which the intensity of the electromagnetic radiation has decreased to 50% of the top intensity within the second area A2. In FIG. 2 the second area A2 is positioned on an area of interest 25.

Figure 3:
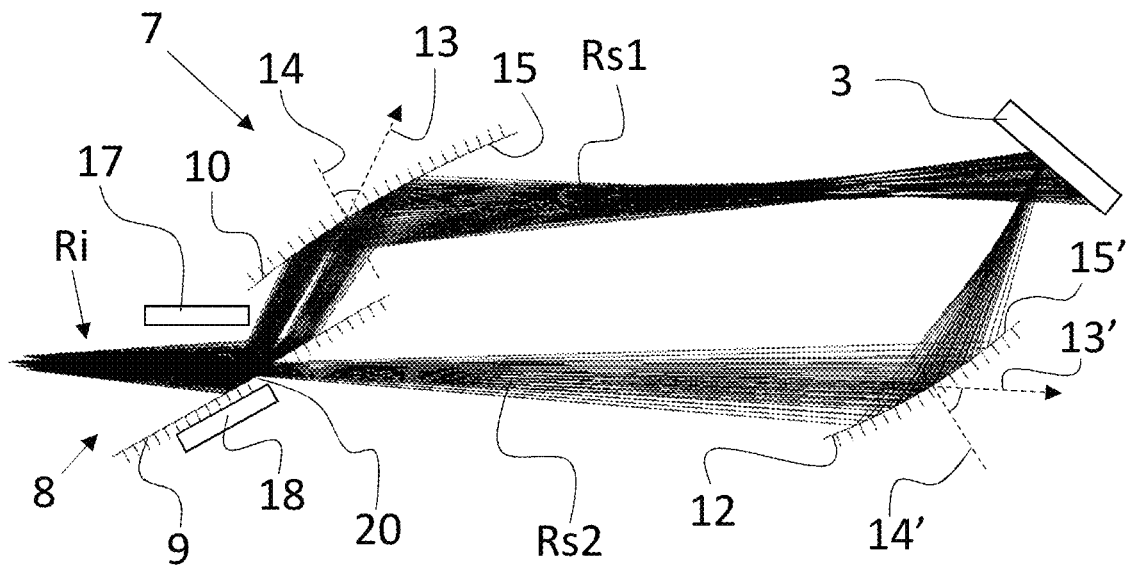
FIG. 3 shows in larger detail the illumination control device in a first mode.
Figure 4:
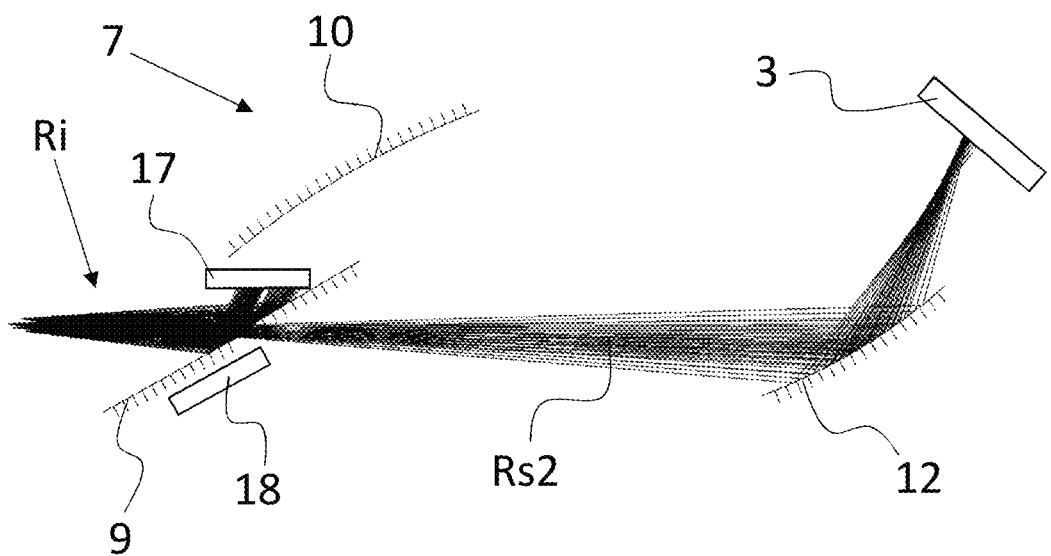
FIG. 4 shows in larger detail the illumination control device in a second mode.
Figure 5:
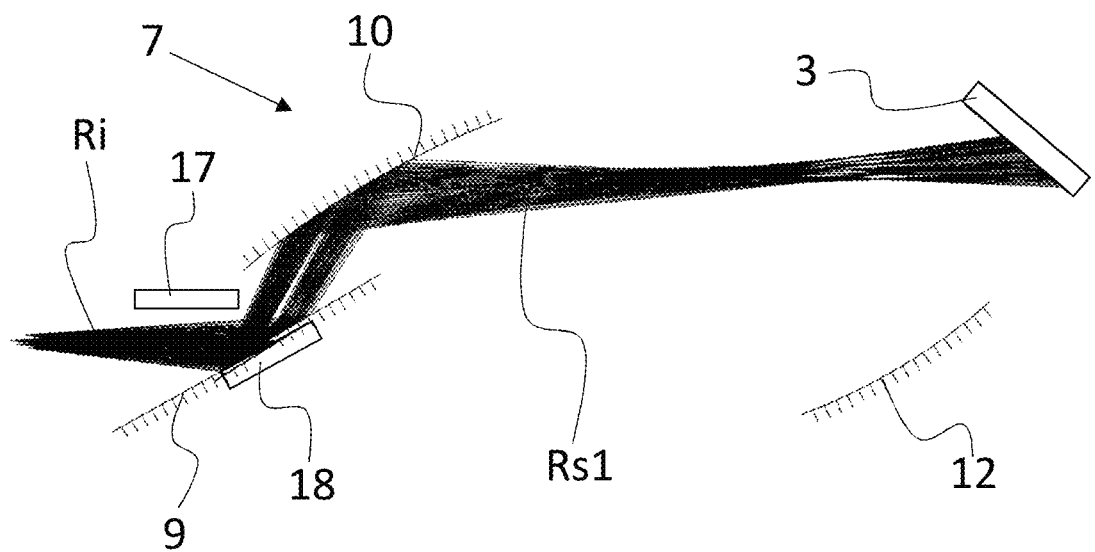
FIG. 5 shows in larger detail the illumination control device in a third mode.

FIGS. 3-5 illustrate in larger detail the illumination control device 7 shown in FIG. 1. The different FIGS. 3-5 show the illumination control device in different modes. FIG. 3 shows the illumination control device 7 in a first mode. The illumination control device has an input 8 at which input electromagnetic radiation Ri is input as an input beam. The input electromagnetic radiation Ri has a photon energy in the interval 5-100 eV and preferably 10-50 eV. The illumination control device 7 comprises a splitting element 9 which is configured to divide the input electromagnetic radiation from the input 8 into the first part Rs1 and the second part Rs2. In the embodiment shown in FIG. 3 the splitting element 9 is a mirror with an oval aperture 20 for the centre part of the input electromagnetic radiation Ri. Due to the splitting element being tilted the shape of the aperture 20, seen along the direction of the input electromagnetic beam, will be circular. The illumination control device 7 also comprises a first direction element 10 for directing the first part Rs1 of the input electromagnetic radiation to the first area A1. The first direction element 10 is in this embodiment a concave mirror. For this energy range the concave mirror is preferably a mirror with a metal reflecting surface 15. The first part Rs1 of the input electromagnetic radiation has a main direction 13 towards the metal reflecting surface 15. FIG. 3 also shows the normal 14 to the metal reflecting surface 15 at the centre of the first part of the input electromagnetic field Rs1. The angle between the normal 14 and the main direction 13 of the first part Rs1 of the input electromagnetic radiation is >70-80°, to maximize the reflection at the metal reflecting surface 15 for the above photon energies. The first part Rs1 of the input electromagnetic field has been reflected in the splitting element 9 surrounding the opening 20. The central part of the input beam constituting the input electromagnetic radiation Ri. The first direction element 10 focuses the first part Rs1 of the input electromagnetic radiation to a point between the first direction element 10 and the sample 3 and directs the first part Rs1 of the input electromagnetic radiation the first area A1. In this way the first area A1 is illuminated with diverging rays of electromagnetic radiation. The focusing of the first part Rs1 of the electromagnetic radiation smoothens out the intensity on the sample 3, thereby avoiding any central minima in the electromagnetic radiation due to the cutting out of the central part in the splitting element 9.

The illumination control device 7 also comprises a second direction element 12 for directing the second part Rs2 of the input electromagnetic radiation to the second area A2. The second direction element 12 is in this embodiment a concave mirror. For this energy range the concave mirror is preferably a mirror with a metal reflecting surface 15'. The second part Rs2 of the input electromagnetic radiation has a main direction 13' towards the metal reflecting surface 15'. FIG. 3 also shows the normal 14' to the metal reflecting surface 15' at the centre of the second part of the input electromagnetic field Rs1. The angle between the normal 14' and the main direction 13' of the second part Rs2 of the input electromagnetic radiation is >75°, to maximize the reflection at the metal reflecting surface 15' for the above photon energies. The second direction element 12 is configured to focus the second part Rs2 of the input electromagnetic radiation on the sample surface in order to illuminate only a small area on the sample 3.

The illumination control device 7 comprises a first blocking member 17 configured to block the first part Rs1 of the electromagnetic radiation when the illumination control device is operating in the second mode.

The illumination control device 7 also comprises a second blocking member 18 which is configured to block the second part of the input electromagnetic radiation. The illumination control device is configured to operate also in a third mode in which the blocking member blocks the second part Rs2 of the input electromagnetic radiation. In the third mode the illumination control device is configured to illuminate only the first area A1 of the sample with the first part of the input electromagnetic radiation.

The operation of the illumination control device 7 will now be described with reference to FIGS. 3-5. The method aims at positioning and analysing a sample in the analyser arrangement 100 for determining at least one parameter related to charged particles emitted from the sample 3. With the analyser arrangement 100 in the spatial mode, the first area A1 of the sample 3 is illuminated with the first part Rs1 of the input electromagnetic radiation as a first ray. Simultaneously, the second area A2 of the sample 3 is illuminated with the second part Rs2 of the input electromagnetic radiation as a second ray. The sample 3 is then positioned with the manipulator 16, while analysing the charged particles. The sample is positioned such that the second area A2 coincides with the area or interest 25 on the sample 3. As both the first area A1 and the second area A2 are illuminated simultaneously analysation of the electrons in the spatial mode provides an image which shows the area of interest 25 and an area surrounding the area of interest 25, and also the illuminated second area A2. Thus, it is possible to determine from the image when the second area A2 is on the sample. This facilitates the positioning of the sample in relation to the second area A2. In the prior art it has not been possible to determine where the second area A2 is positioned as it is so small.

After positioning of the second area A2 to be on the area of interest 25, the analyser arrangement 100 is switched to the angular mode. The second area A2 of the sample is then illuminated only with the second ray of electromagnetic radiation as is depicted in FIG. 4 in which the first part Rs1 of the input electromagnetic radiation Rs1 is blocked by the first blocking member 17. While only the second area A2 is illuminated with the second ray, i.e., the second part of the input electromagnetic radiation, the charged particles are analysed based on their angular distribution from the sample.

FIG. 5 shows the illumination control device 7 in a third mode in which the second blocking member 18 blocks the second part Rs2 of the input electromagnetic radiation and the sample is illuminated only with the first part Rs1 of the input electromagnetic radiation. The third mode is useful when the analyser arrangement is operated in the spatial mode.

Figure 6:
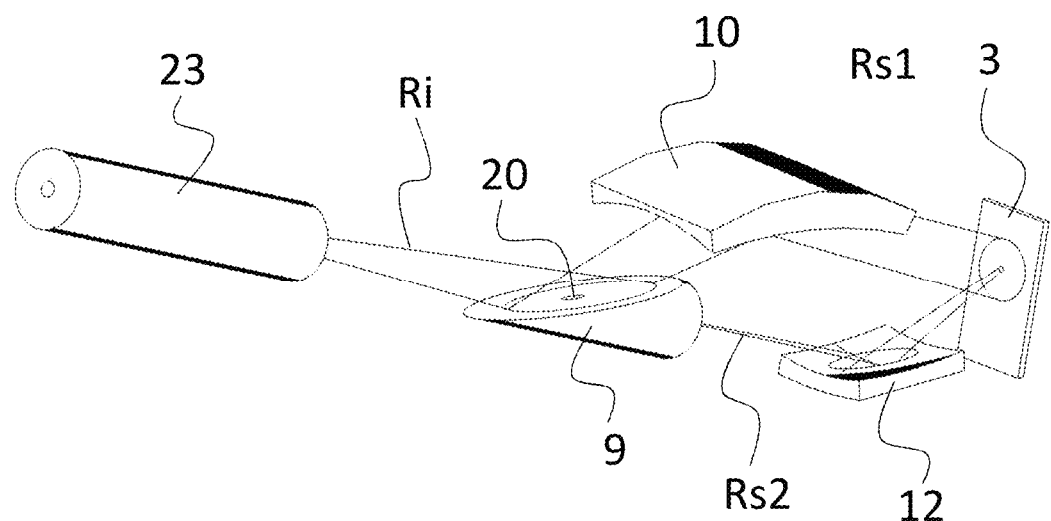
FIG. 6 shows schematically in a perspective view of an illumination control device similar to that shown in FIG. 1.

FIG. 6 shows schematically in a perspective view of an illumination control device similar to that shown in FIG. 1. In FIG. 6 a light source in the form of an end of a capillary 23 is shown. The capillary 23 emits input electromagnetic radiation as an input beam Ri towards the splitting element 9, which divides the input beam Ri into the first part Rs1 and the second part Rs2. In FIG. 6 the splitting element is in the form of a cut capillary. This is an easy way of making the splitting element as the aperture is already formed in the capillary. The first direction element 10 and the second direction element 12 as well as the sample 3 are also shown in FIG. 6.

The above described embodiments may be altered in many ways without departing from the scope of the invention which is limited only by means of the appended claims and their limitations.

It is of course possible to add addition direction elements in the form of, e.g., additional mirrors between the splitting element 9 and the sample 3.

The invention claimed is:

1. An illumination control device, for an analyser arrangement, which is configured to determine at least one parameter related to charged particles emitted from a sample, and which may be operated in a spatial mode in which the charged particles are analysed based on their spatial origins from the sample, and an angular mode in which the charged particles are analysed based on their angular distribution from the sample, wherein the illumination control device comprises an input for input electromagnetic radiation, and is configured to control the illumination of the sample with the input electromagnetic radiation in order to induce the emission of charged particles from the sample, characterised in that the illumination control device is configured to operate in at least a first mode and a second mode, wherein the illumination control device in the first mode, is configured to illuminate a first area of the sample with a first part of the input electromagnetic radiation and a second area of the sample with a second part of the input electromagnetic radiation, and in a second mode, is configured to illuminate the second area of the sample with the second part of the input electromagnetic radiation, and wherein the second area is a part of the first area.

2. The illumination control device of claim 1, further comprising
   a splitting element which is configured to divide the input electromagnetic radiation from the input into the first part and the second part,
   a first direction element for directing the first part of the electromagnetic radiation to the first area,
   a second direction element for directing the second part of the electromagnetic radiation to the second area.

3. The illumination control device of claim 2, further comprising a first blocking member configured to block the first part of the input electromagnetic radiation when the illumination control device is operating in the second mode.

4. The illumination control device of claim 3, further comprising a second blocking member and configured to operate also in a third mode in which
   the second blocking member is configured to block the second part (Rs2 of the input electromagnetic radiation, and
   in which the illumination control device is configured to illuminate only the first area of the sample with the first part of the input electromagnetic radiation.

5. The illumination control device of claim 2, wherein the splitting element is a mirror comprising an aperture, wherein the mirror is configured to reflect the first part or the second part of the input electromagnetic radiation towards the corresponding direction element and wherein the aperture is configured to allow the other part of the input electromagnetic radiation to pass to the corresponding direction element.

6. The illumination control device of claim 2, wherein the first direction element comprises a first concave mirror which is configured to focus the first part of the input electromagnetic radiation and to direct the first part of the input electromagnetic radiation the first area.

7. The illumination control device of claim 2, wherein the second direction element comprises a second concave mirror which is configured to focus the second part of the input electromagnetic radiation and to direct the second part of the input electromagnetic radiation to the second area.

8. The illumination control device of claim 7, wherein the first concave mirror and the second concave mirror are arranged such that the main direction of the corresponding electromagnetic radiation from the splitting element is incident on the first mirror and the second concave mirror at an angle of >70° to the normal to the corresponding mirror.

9. An analyser arrangement for determining at least one parameter related to charged particles emitted from a sample, wherein the analyser arrangement may be operated in a spatial mode in which the charged particles are analysed based on their spatial origins from the sample, and an angular mode in which the charged particles are analysed based on their angular distribution from the sample, and wherein the analyser arrangement comprises an illumination control device of claim 1.

10. The analyser arrangement of claim 9, comprising
    a measurement region having an entrance allowing said particles to enter the measurement region;
    a lens system for forming a particle beam of said charged particles and transporting the particles between said particle emitting sample and said entrance of the measurement region, said lens system having a substantially straight optical axis; and
    a analyser device for detecting, in the angular mode, the positions of the charged particles in the measurement region, said positions being indicative of said at least one parameter.

11. A method for positioning and analysing a sample in an analyser arrangement for determining at least one parameter related to charged particles emitted from the sample,
    wherein the analyser arrangement is configured to be operated in
    a spatial mode in which the charged particles are analysed based on their spatial origins from the sample, and
    an angular mode in which the charged particles are analysed based on their angular distribution from the sample,
    wherein the method comprises the steps of
    with the analyser arrangement in the spatial mode:

illuminating, with a first ray of electromagnetic radiation, a first area of the sample, illuminating, with a second ray of electromagnetic radiation, a second area of the sample, and positioning, while analysing the charged particles, the sample such that the second area coincides with an area of interest;

and with the analyser arrangement in the angular mode:

illuminating only the second area of the sample with the second ray of electromagnetic radiation, and analysing the charged particles based on their angular distribution from the sample, wherein the second area is a part of the first area.

12. The method of claim 11, wherein the electromagnetic radiation has a photon energy in the interval 5-100 eV.

13. The method of claim 11, wherein the first area has a largest dimension on the sample in the interval 0.05-5 mm.

14. The method of claim 13, wherein the largest dimension of the first area is defined as the area within which the intensity of the electromagnetic radiation is at least 50% of the top intensity of the first ray at the sample.

15. The method of claim 11, wherein the second area has a largest dimension on the sample in the interval 1-100 µm.

16. The method of claim 15, wherein the largest dimension of the second area is defined as the area within which the intensity of the electromagnetic radiation is at least 50% of the top intensity of the second ray at the sample.

* * * * *